G. S. HASTINGS.
Attaching Knives and Forks to Handles.
No. 8,000. Reissued Dec. 18, 1877.
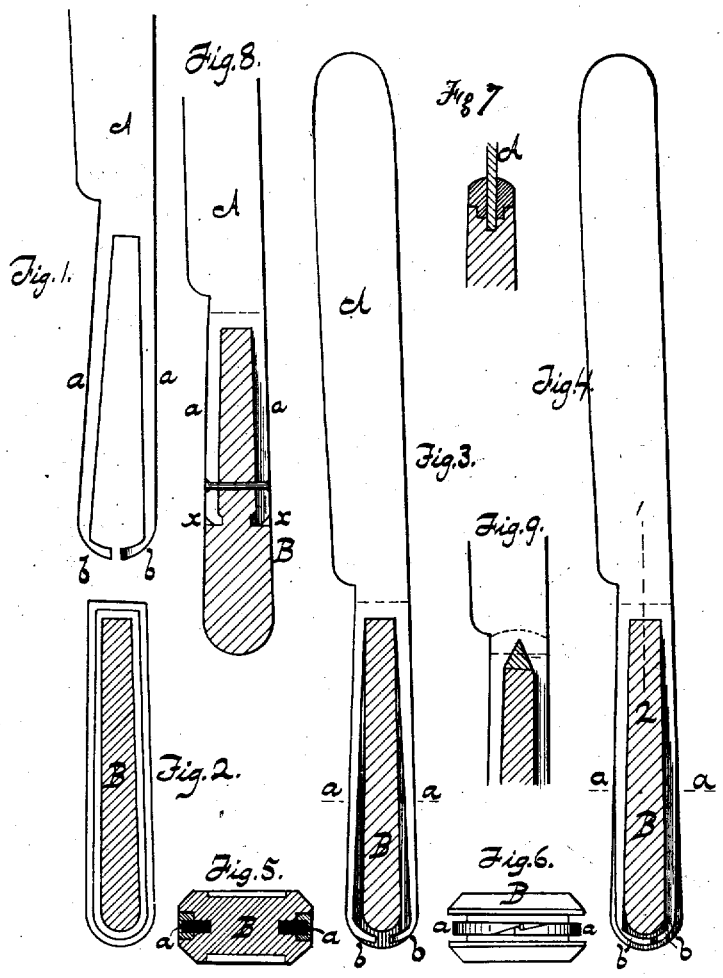
Witnesses:
Robt F. Gaylord,
Lewis Sperry
Inventor:
G. S. Hastings
By W. E. Simonds
Atty
N. PETERS, PHOTO-LITHOGRAPHER, WASHINGTON, D. C.

UNITED STATES PATENT OFFICE.

GLOVER S. HASTINGS, OF PLAINVILLE, CONNECTICUT.

IMPROVEMENT IN ATTACHING KNIVES AND FORKS TO HANDLES.

Specification forming part of Letters Patent No. 181,676, dated August 29, 1876; Reissue No. 8,000, dated December 18, 1877; application filed August 3, 1877.

*To all whom it may concern:*

Be it known that I, GLOVER S. HASTINGS, of Plainville, formerly of Unionville, Hartford county, Connecticut, have invented certain Improvements in Table-Knives, and handles for the same, of which the following is a specification:

The object of my invention is to secure the blade of table-knives to handles in a substantial and permanent manner; and this object I attain in the manner which I will now proceed to describe.

In the accompanying drawing, Figure 1 represents part of the blade of a knife detached from the handle; Fig. 2, a sectional view of the handle; Figs. 3 and 4, views showing the mode of applying the forked end of the blade to the handle; Fig. 5, a transverse section of the handle, drawn to an enlarged scale; Fig. 6, an end view of the handle, also drawn to an enlarged scale; Fig. 7, a section on the line 1 2 of Fig. 4; and Figs. 8 and 9, modifications of my invention.

The blade A of the knife, instead of being furnished at its inner end with the usual tang, is forked, as shown in Fig. 1, the prongs *a a* being but slightly thicker than the blade, and being bent at their outer ends toward each other, and these bent ends *b b* being hooked, so as to interlock, in the manner shown in Fig. 6.

The handle B is made in one piece, and has a T-shaped groove, (shown in Fig. 5,) which is continued along the opposite edges and ends, as best observed in Fig. 2.

The prongs *a a* of the blade are first spread apart for the admission of the handle, and after the latter has been introduced, as shown in Fig. 3, and the prongs released, the latter will recoil and enter the narrowest portion of the T-shaped groove, into which the prongs may be compressed, as shown in Fig. 4, and interlocked at their outer bent ends, as illustrated in Fig. 6.

The handle combined with the forked end of the blade presents two channels, Fig. 5, separated from each other by the prongs, the channels being continued along the edges and opposite ends of the blades, and these channels may be filled with cement of suitable character; but I prefer to pour into them a metal or alloy which will melt at a comparatively low temperature, and become hard when cool. I also prefer to make the groove in the handle of such a depth, compared with the width of the prongs, that when the cement or metal has been applied it will conceal the said prongs, as shown in Fig. 5.

The above-described mode of securing blades to handles permits me to make the latter of glass, earthenware, or other like material which, under ordinary circumstances, may be easily fractured, but which, in my invention, is effectually embraced and protected by the prongs and the cement, metal, or alloy.

My invention may also be used with advantage in connection with handles of a tougher material—such as wood, bone, hard rubber, ivory, &c.—in which case the groove in the handle and the prongs may terminate at *x x*, Fig. 8, the said prongs being locked to the handle in the manner there shown. In some cases, also, a V-shaped recess may be formed at the point where the prongs join the blade, as in Fig. 9, the filling material entering this recess, and forming a bolster to strengthen the connection of the knife and handle.

It will be evident that my invention may be applied to table-forks, and to all knives in which a secure and permanent attachment of the blade to the handle is desirable.

I am aware that knives and forks have heretofore been made with blades having forked ends adapted to grooves in the handle. This I do not claim; but

I claim as my invention—

1. The combination of the handle, having a groove extending along its opposite edges and ends, with a blade having prongs *a a*, adapted to the groove, and curved and notched at their outer ends, so as to be interlocked and embrace the handle, all substantially as set forth.

2. The combination of the prongs *a a* with a handle having a T-shaped groove deeper than the prongs are wide, and wider near the edges of the handle than the prongs are thick, as and for the purpose specified.

3. In combination, three elements—to wit, the blade with bifurcated end, the grooved handle, and the cement, metal, or alloy embracing the end and sides of the handle.

In testimony whereof I have signed my name to this specification in the presence of two subscribing witnesses.

GLOVER S. HASTINGS.

Witnesses:

R. C. USHER,

FRANK S. NEAL.